United States Patent [19]

Manfre

[11] Patent Number: 5,007,612

[45] Date of Patent: Apr. 16, 1991

[54] RAIL MATE

[76] Inventor: Robert A. Manfre, 389 Hendrickson Ave., Valley Stream, N.Y. 11580

[21] Appl. No.: 512,879

[22] Filed: Apr. 23, 1990

[51] Int. Cl.$^5$ ............................................. F16M 13/00
[52] U.S. Cl. ................................ 248/558; 220/DIG. 9; 248/231.7; 248/311.2; 248/314; 248/911
[58] Field of Search ................... 248/311.2, 231.7, 911, 248/912, 558, 314; 220/DIG. 9

[56] References Cited

U.S. PATENT DOCUMENTS

| | | | |
|---|---|---|---|
| 1,527,042 | 2/1925 | Gaut | 248/231.7 X |
| 1,715,715 | 6/1929 | McVey | 248/231.7 X |
| 2,551,157 | 5/1951 | Price | 248/231.7 X |
| 3,021,106 | 2/1962 | Kramer | 248/311.2 X |
| 3,270,694 | 9/1966 | Wallace et al. | 248/311.2 X |
| 3,333,807 | 8/1967 | Locatelli | 248/231.7 |
| 3,848,766 | 11/1974 | Ganti et al. | 220/DIG. 9 X |
| 4,560,128 | 12/1985 | Willeby et al. | 248/311.2 X |

FOREIGN PATENT DOCUMENTS 20513  9/1912  United Kingdom ............ 248/231.7

Primary Examiner—David L. Talbott
Attorney, Agent, or Firm—Richard L. Miller

[57] ABSTRACT

This rail mate is designed to clamp onto a boat handrail and hold food and drink while a fisherman concentrates on fishing, and the device will keep a beverage cold or hot for a long period of time. The device utilizes a main body having a clamp frame that fits over a boat rail and a pair of clamp members within the clamp frame engage with the handrail, and tightening of the clamp members to hold the main body secured to the handrail is effected by a clamp screw and rod that are rotated. Provision is also made for the clamp frame to engage with a rectangular boat rail by the removal of the pair of clamp members, the clamp screw, and the rod thereof.

6 Claims, 1 Drawing Sheet

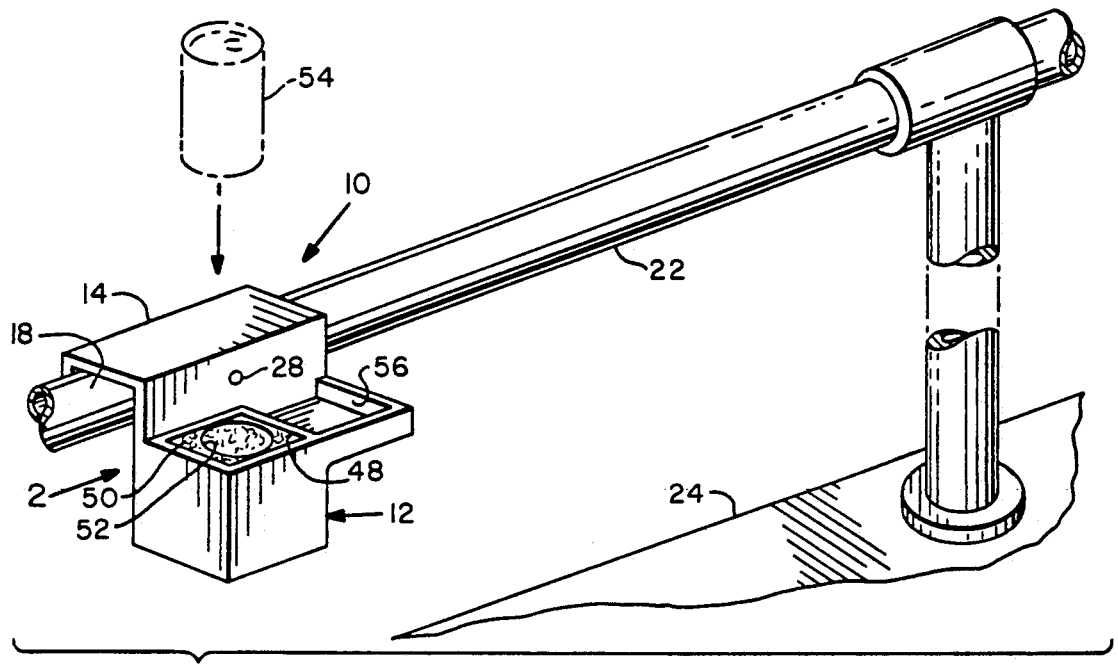
FIG. 1
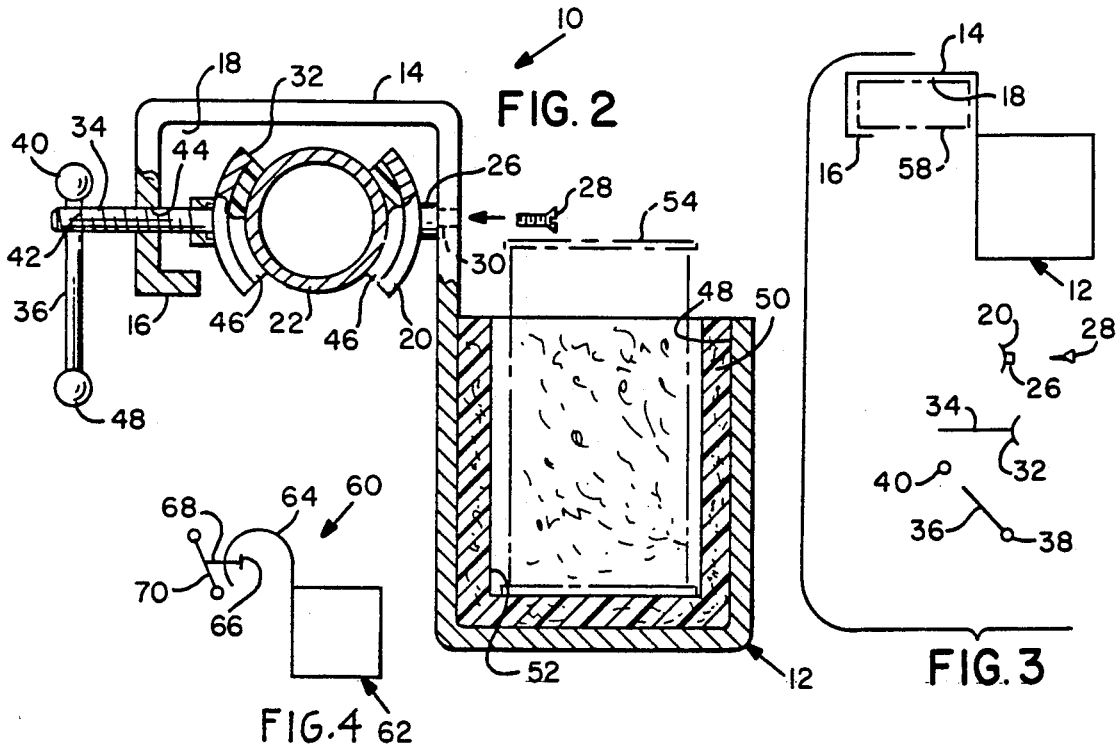
FIG. 2
FIG. 3
FIG. 4

RAIL MATE

BACKGROUND OF THE INVENTION

The instant invention relates generally to holding devices for boats, and more particularly, to the railmate for holding incidental items to a boat's railing Numerous holding devices have been provided in the prior art that are adapted to support various articles. For example, U.S. Pat. Nos. 4,504;992 of Herron et al; 4,108,413 of Goserud; and 2,721,718 of Wagner, are all are illustrative of such prior art. While these units may be suitable for the particular purpose to which they address, they would not be as suitable for the purpose of the present invention as hereafter described.

SUMMARY OF THE INVENTION

A primary object of the present invention is to provide the rail mate that will overcome the shortcomings of the prior art devices.

Another object is to provide the rail mate that is so designed as to clamp onto a boat handrail and hold typically food and drink while a fisherman concentrates upon fishing.

An additional object is to provide the rail mate that will keep a can of beverage cold for a long period of time, and will not vibrate loose or be come dislodged in rough seas.

A further object is to provide the rail mate that is simple and easy to use.

A still further object is to provide the rail mate that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view of the instant invention, showing how a beverage can in phantom can be placed in the instant invention;

FIG. 2 is a view with parts broken away taken in the direction of arrow 2 in FIG. 1;

FIG. 3 is a diagrammatic side elevational view illustrating how the instant invention can be installed on a rectangular rail instead of a round rail when some components are removed therefrom; and FIG. 4 is a view similar to FIG. 3 but showing another embodiment of the invention.

DETAILED DESCRIPTION OF THE PREFERRED EMBODIMENTS

Turning now descriptively to the drawings, in which like reference characters denote like elements throughout the several views, a device 10 is shown to include a main body 12 having an upper clamp frame 14 integrally attached and provided with a lip 16 that defines a partially open box-like opening 18, for a purpose which hereinafter will be described.

A first clamp member 20 is provided and curved to conform to an outer peripheral surface of a cylindrical handrail 22 of a boat 24, and a mounting stanchion 26 is fixedly secured to the convex surface of first clamp member 20, the threaded screw 28 being provided for entry into a threaded opening (not shown) through mounting stanchion 26. A second clamp member 32 is provided and similarly curved, and is rotatively secured to a clamp screw 34 that is provided with a rod 36 having a first ball 38 fixedly secured to one end.

A second ball 40 is threaded onto the opposite end of rod 36, for a purpose which hereinafter will be described, and rod 36, is freely and slideably received in opening 42 through clamp screw 34. The clamp screw 34 is threaded into threaded opening 44 of clamp frame 14 and rod 36 provides for tightening clamp frame 14 onto boat handrail 22.

It shall be noted that a rubber strip 46 is fixedly secured to the concave surfaces of the first clamp member 20 and the second clamp member 32, so as to firmly grip a boat handrail 22, regardless of its outside diameter of the boat rail.

A first cavity 48 is provided in main body 12 and is walled with foam plastic insulation material 50, so that the opening 52 therein may removably receives a beverage can 54. A second cavity 56 is shallow and provided adjacent to first cavity 48, for the placement of food, etc.

In use, the clamp frame 14 of device 10 is placed over the cylindrical handrail 22 between the first clamp member 20 and the second clamp member 32. After the above, the rod 36 is rotated to tighten clamp members 20 and 32 against the handrail 22. A can 54 containing a beverage is placed in the opening 52 where the insulation material 50 will keep the beverage cold for a long period of time.

The second cavity 56 is employed to hold food or other articles as desired.

Referring now to diagrammatic FIG. 3, it will be seen that device 10 is adaptable to handrail 58 of rectangular cross-section, by the removal of the second ball 40, the rod 36, the clamp 34 and its attached second clamp member 32, the first clamp member 20, and the threaded screw 28.

When these items are removed then the device 10 is manipulated to force-fit rectangular handrail 58, the lip 16 of clamp frame 14 engages with the bottom surface of the handrail 58 and prevents accidental falling off of device 10 therefrom.

Looking now at diagrammatic FIG. 4, a second embodiment 60 includes a main body 62 having an upper and integrally attached curved clamp frame 64 for engagement with boat handrail 22, and a T-shaped clamp screw 68 and rod 70 combination is threaded into clamp frame 64, for providing pressure against handrail 22 and forcing handrail 22 against an inside surface of curved clamp frame 64.

In use, the function of embodiment 60 is the same as heretofore described of device 10, except that only lends it self to installation on a cylindrical rail.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A rail mate for a boat handrail of either cylindrical or rectangular shape comprising a main body providing means for receiving and vertically stabilizing a cold beverage container and keeping said beverage container cool and for receiving and supporting food and other articles, a rail engaging clamp of inverted channel shaped integrally attached to said main body and comprising a base wall having opposite longitudinal side edges of the base wall a rail engaging lip projecting from the free end of the second side wall, parallel to the base part way towards the first side wall so that the side walls, base and lip define a rail receiving enclosure with a rail admitting mouth formed between an adjacent free end of the lip and the first side wall, the beverage receiving and stabilizing means and the food receiving and supporting means being formed on an extension of the first side wall remote from the base wall, first and second clamp members releasably fastened to respective side walls so as to extend within the enclosure, means to advance one clamp member relatively towards the other clamp member into cooperative clamping engagement with cylindrical boat rail of substantially smaller cross sectional size than the enclosure, whereby, after removal of the clamp members, a boat rail of rectangular shape inserted through the mouth can be received in the enclosure in a force-fit to extend along the channel engaged by all four sides thereof.

2. A rail mate for a handrail of a boat as recited in claim 1, wherein said means for receiving and vertically stabilizing a cold beverage and keeping said beverage cool is a cavity in the main body lined with an insulation material, and an opening defined in said insulation material which may removably receive said beverage.

3. A rail mate for a handrail of a boat as recited in claim 1, wherein said means for receiving and supporting food and other articles is a second pocket adjacent to said first cavity in said main body and a divider wall provides separation means between said first pocket and said second cavity in said main body.

4. A rail mate for a handrail of a boat as recited in claim 1, wherein said first clamp member and said second clamp member include a rubber strip fixedly secured to a concave surface and said rubber strip of said first clamp member and said second clamp member frictionally engages with and adapts said first clamp member and said second clamp member to secure firmly against an outer periphery of said handrails of different diameters, and said second clamp member is advanceable to and away from said handrail and said first clamp member by a clamp screw rotatively received in said clamp frame.

5. A rail mate for a handrail of a boat as recited in claim 4, wherein said clamp screw is fixedly secured at one end to said second clamp member and said clamp screw is threaded into an opening of another side of said clamp frame and slideably receives a rod for rotating said clamp screw, and a first ball is fixedly secured to one end of said rod and a second ball is internally threaded and threads onto another end of said rod, enabling removal of said rod from said clamp screw.

6. A method of securing a rail mate to a handrail of a boat wherein said means for attaching said rail mate to a rectangular handrail of a boat comprises: unthreading a ball from a rod; removing said rod from a clamp screw; unthreading said clamp screw from a clamp frame; removing a threaded screw from said clamp frame and a first clamp member; and force-fitting said clamp frame onto said rectangular handrail, whereby a lip integrally attached to said clamp frame provides stop means against a bottom surface of said rectangular handrail and prevents said clamp frame from accidentally coming off of said rectangular handrail.

* * * * *